US005783919A

United States Patent [19]

Dehli et al.

[11] Patent Number: 5,783,919

[45] Date of Patent: Jul. 21, 1998

[54] DISPLAY APPARATUS WITH AC GEAR MOTOR DRIVE CONTROL

[75] Inventors: Hans J. Dehli, Dana Point; Bradford D. Peeters, Costa Mesa, both of Calif.

[73] Assignee: Admotion Corporation, Irvine, Calif.

[21] Appl. No.: 602,980

[22] Filed: Feb. 16, 1996

[51] Int. Cl.$^6$ .................................................... G05B 5/00

[52] U.S. Cl. .......................... 318/466; 318/470; 318/484; 40/466; 40/470

[58] Field of Search .............................. 40/463–470, 476; 318/640, 445, 446, 466, 470, 484

[56] References Cited

U.S. PATENT DOCUMENTS

| | | |
|---|---|---|
| 3,277,597 | 10/1966 | Trame . |
| 3,742,631 | 7/1973 | Hasala . |
| 3,747,243 | 7/1973 | Schneider . |
| 3,827,797 | 8/1974 | Eaves . |
| 3,862,504 | 1/1975 | Ringelheim et al. . |
| 3,883,966 | 5/1975 | Ludwig . |
| 3,918,185 | 11/1975 | Hasala . |
| 3,928,846 | 12/1975 | Arai et al. . |
| 4,092,791 | 6/1978 | Apissomian . |
| 4,142,794 | 3/1979 | Trump . |
| 4,159,176 | 6/1979 | De Masi . |
| 4,246,713 | 1/1981 | Eckert . |
| 4,860,471 | 8/1989 | Bonanomi . |
| 4,864,361 | 9/1989 | Amao et al. . |
| 4,878,086 | 10/1989 | Isohata et al. . |
| 4,897,802 | 1/1990 | Atkinson et al. . |
| 5,440,214 | 8/1995 | Peeters . |
| 5,488,281 | 1/1996 | Unsworth et al. ...................... 318/806 |
| 5,488,791 | 2/1996 | Boni .......................................... 40/467 |
| 5,513,458 | 5/1996 | Dehli .......................................... 40/470 |

*Primary Examiner*—Brian Sircus
*Attorney, Agent, or Firm*—Fulwider Patton Lee & Utecht, LLP

[57] ABSTRACT

A display device for sequentially displaying multiple sets of image pixels formed on a transparent mosaic through an aperture pattern formed in a substantially opaque mask. An AC gear motor and drive assembly is employed to move the mosaic through a predetermined travel path relative to the mask to sequentially register the image sets with the aperture pattern. A control system is employed to temporarily deactivate the gear motor at predetermined precise positions to display the various images through the aperture pattern.

14 Claims, 4 Drawing Sheets

DISPLAY APPARATUS WITH AC GEAR MOTOR DRIVE CONTROL

BACKGROUND OF THE INVENTION

1. Field of the Invention

The present invention relates to advertising displays for sequentially displaying multiple high resolution images in a single display and, more particularly, to a gear motor drive and control assembly for such a display apparatus.

2. Description of the Prior Art

With the advent of modern display advertising, limitations on advertising budgets and limited locations for display to high densities of potential customers, a great demand has arisen for display advertising which allows for momentary display of multiple advertisements at one desirable display location to thereby enable a number of advertisers to benefit from the single location. In addition, it is desirable to provide such a device which may be utilized in relatively confined spaces, such as immediately adjacent the product or products themselves. Devices of this type typically are used in public retail outlets or other public locations frequented by a large number of potential purchasers.

Numerous different methods and devices have been proposed for preparing and displaying such advertisements. Many such devices involve relatively unwieldy mechanical elements driven by complex drive mechanisms which tend to be relatively bulky. Thus such devices are typically relatively large and expensive to manufacture and therefore not suitable for display in relatively confined areas and in many cases not economically feasible in lieu of conventional advertising displays.

Display devices have been proposed which include generally opaque screens formed with aperture patterns defining numbers, letters or figures to be illuminated by back lighting. Examples of such devices are disclosed in U.S. Pat. No. 1,172,455 to Hildburgh and in U.S. Pat. No. 4,246,713 to Eckert. However, such devices do not provide for sequentially displaying distinct advertisements or images which cover substantially the entire display screen.

There are also prior art devices which include transparent sheets formed with images thereon and which are illuminated by back lighting and cooperate with movable opaque masks including aperture patterns for selectively registering the aperture pattern with one of the images formed on the transparent sheet. Examples of such devices are disclosed in U.S. Pat. No. 4,092,791 to Apissomian and in U.S. Pat. No. 3,918,185 to Hasala. These devices are not free from shortcomings, however. In the first place, the devices incorporate relatively complex drive assemblies in order to sequentially align the various images on the sheets with the aperture pattern on the masks. In addition, the drive assemblies incorporated in those devices are somewhat imprecise, thus requiring the apertures in the masks to be formed with somewhat smaller dimensions than those of the image cells to allow for a certain degree of misalignment which results in some of the image being blocked and thus a reduction in resolution of the images displayed.

Yet another device which includes a translucent image screen comprising a mosaic of discrete images formed by relatively small translucent pixels interlaced and arranged in uniform groups for sequential alignment with an aperture pattern formed on a stationary mask is disclosed in U.S. Pat. No. 4,897,802 to Atkinson et al., assigned to the assignee of the present application. The device exhibits excellent operational characteristics. However, the device incorporates a somewhat complex and expensive drive assembly including drive motors mounted at each of the respective corners of the apparatus for displacing the mosaic relative to the grid mask to sequentially display the discrete images formed on the mosaic.

Still another prior art device designed for sequentially displaying a plurality of images formed on one sheet is disclosed in U.S. Pat. No. 5,440,214 to Peeters, likewise assigned to the assignee of the present invention. The device disclosed in this patent is an efficient, reliable apparatus that provides for the sequential display of multiple high resolution images in a fast and accurate manner. This device, while having been well received commercially, is relatively expensive to manufacture due to the fact that it employs a microprocessor-controlled stepper motor in order to drive the mosaic to sequentially register the image pixel sets with the apertures in the mask.

As such, it will be appreciated that there continues to be a need for a display apparatus which incorporates a relatively simple, precise drive assembly to sequentially register the image pixel sets with the aperture pattern in the mask and which further includes an economical control assembly for interrupting the operation of the drive assembly at various dwell points to display the images for predetermined amounts of time. The instant invention addresses such needs.

SUMMARY OF THE INTENTION

Briefly, and in general terms, the present invention is directed to a display apparatus which sequentially displays sets of image pixels corresponding with discrete images interlaced on a transparent mosaic through an aperture pattern formed in a substantially opaque mask. The apparatus includes a housing comprising a mounting assembly to fixedly mount the mask thereon and an eccentric rotary drive assembly engageable with the mosaic and operative to move the mosaic through a predetermined travel path to sequentially register the pixel sets with the apertures in the mask. A motor may be in the form of an AC motor coupled by a gear chain to the drive assembly to thereby move the mosaic through its travel path. A location sensor senses travel of the motor and is operative through a control circuit to essentially open the circuit to the AC motor to promptly stop travel of the mosaic at selected dwell points.

In one embodiment, the motor is a synchronous motor connected with a control circuit which includes a sensor cam mounted on the drive shaft of the motor and includes a peripheral surface formed with a plurality of cam risers disposed thereon in predetermined positions corresponding with the precise alignment of the image pixel sets with the apertures formed in the mask. A sub miniature switch includes a cam follower disposed in sliding contact with the cam surface. The control circuit further includes a timing circuit comprising a pair of contacts for respective engagement with such control switch to be driven between the first and second positions. The control circuit may further include circuitry responsive to deactivation of the gear motor to reactuate same after a predetermined amount of time has elapsed to repeat the process. The cam is synchronized with movement of the mosaic relative to the mask so that when selected image segments are aligned with apertures in the mask, the power supply is temporarily disconnected from the synchronous motor to bring it instantly to a stop for a selected dwell time.

DETAILED DESCRIPTION OF THE PREFERRED EMBODIMENT

Figure 1:
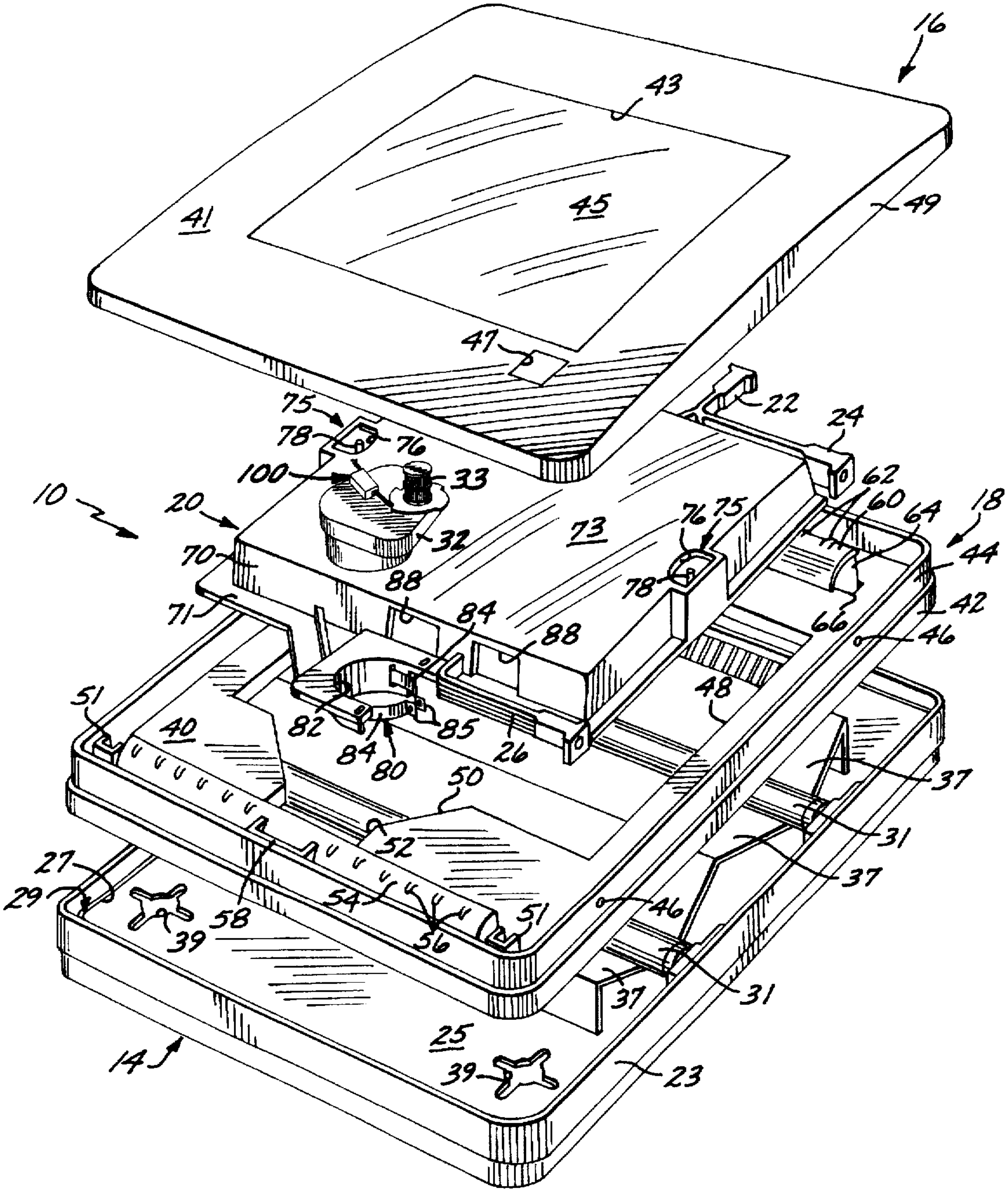
FIG. 1 is an exploded perspective view of a display apparatus embodying certain elements of the present invention.
Figure 2:
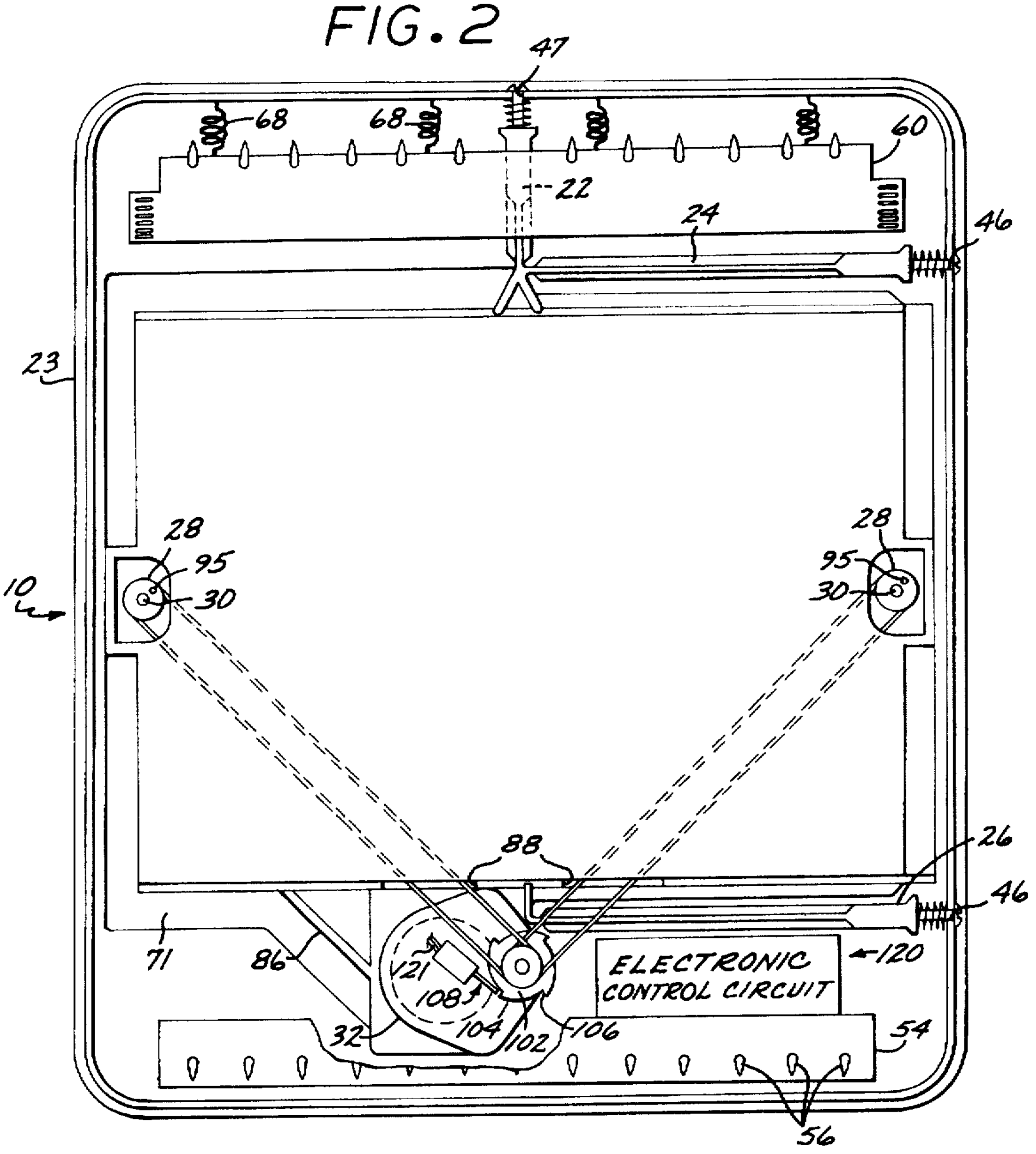
FIG. 2 is a horizontal cross-sectional view, in enlarged scale, of the apparatus shown in FIG. 1.

In the following detailed description, like reference numerals will be used to refer to like or corresponding elements in the different figures of the drawings. Referring now to the drawings, and particularly to FIGS. 1 and 2, there is shown, generally, a display apparatus 10 of the type disclosed in patent application, Ser. No. 08/575,410, filed Dec. 20, 1995, and now U.S. Pat. No. 5,657,565, which is incorporated herein by reference and will be described herein because it embodies certain aspects of the present invention and is provided for exemplary purposes to illustrate one type of display apparatus which may be used with the present invention. Referring to FIGS. 1 and 2, the display apparatus 10 comprises, generally, a housing 12 including a rectangular base pan 14 and cover 16. The housing houses therein a frame assembly comprising, generally, a rectangular main frame 18 and a platen frame 20 carried within the main frame for adjustable movement relative thereto.

Figure 3:
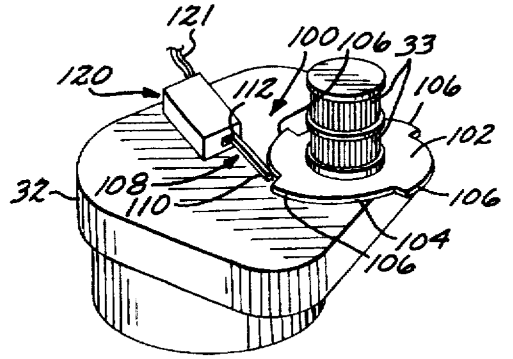
FIG. 3 is a perspective view, in enlarged scale, of a gear motor and timing control system included in the apparatus shown in FIG. 1.
Figure 5:
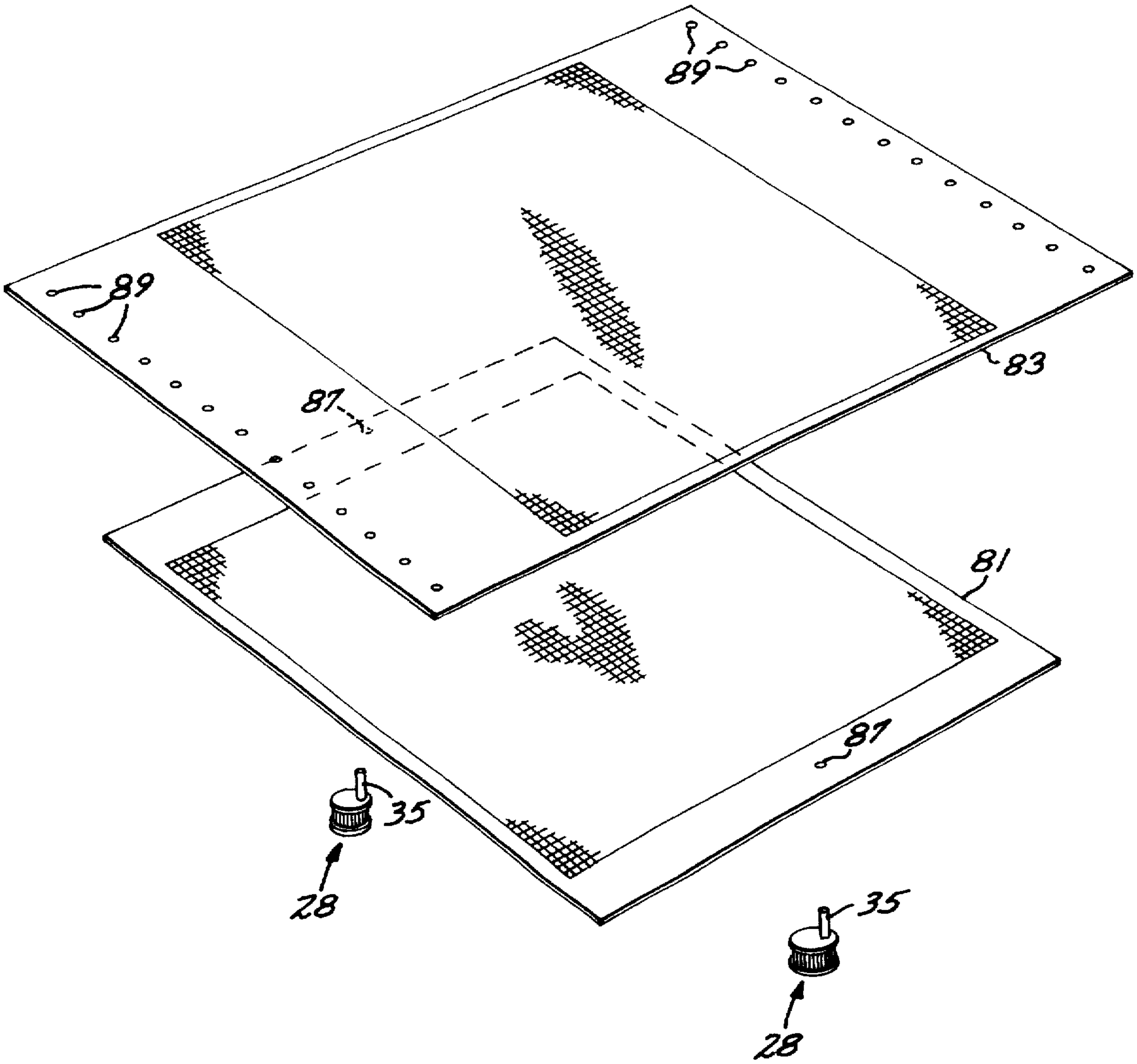
FIG. 5 is an exploded perspective view of a mosaic and mask for mounting on the apparatus shown in FIG. 1.

The platen frame 20 includes a plurality of flexible, resilient, spaced apart biasing arms 22, 24 and 26 projecting cantileverly from the opposite ends thereof for adjustable connection at their respective distal ends with the main frame to allow the platen frame to be displaced relative to the main frame. The platen frame rotatably mounts on the opposite sides thereof a pair of eccentric drives, generally designated 28 (FIG. 2). The eccentric drives are rotated by means of a gear motor 32 mounted to the bottom end of such platen frame 20 to drive a pair of endless timing drive belts 34 threaded over a double grooved drive pinion 33 carried on the motor drive shaft 35 (FIG. 3). While such drive motor may take many different forms, one which has proven to perform well is a synchronous motor and gear box, Model No. 105, available from Cramer Co., Old Saybrook, Conn., U.S.A. A mosaic 81 comprising a plurality of interlaced pixels corresponding with a plurality of discrete images may be releasably mounted on the platen frame 20 to be drivingly engaged with the respective eccentric drives by means of respective mounting bores 87 to be driven thereby through a predetermined closed loop path (FIG. 5). A generally opaque mask 83 having a uniform aperture pattern formed thereon and a plurality of bores 89 may be mounted on the main frame 18 between the mosaic on such platen frame and the cover 16 to provide for sequential registration of the image pixels, corresponding to the respective discrete images formed on the mosaic, with the aperture pattern on the mask as the mosaic is displaced relative to the mask during operation of the eccentric drives.

The base pan 14 is generally rectangular in cross-section and includes a back plate 25 and an upstanding peripheral wall 23 and a coextensive upstanding interior wall 27 (FIG. 1). The respective walls cooperate to define therebetween a peripheral, upwardly opening groove 29 for receipt therein of the bottom marginal edge of the main frame 18 as described in greater detail below. Referring to FIG. 1, the pan mounts therein a pair of spaced apart light tubes 31 interposed between a plurality of laterally projecting, triangularly shaped reflectors 37 which extend, at their respective apexes, outwardly above the plane of the outermost peripheries of the respective tubes to thus protect the tubes from being struck when the main frame is manipulated about during assembly. The back plate 25 is formed at its four corners with spaced apart cruciform mounting holes 39 for conveniently mounting of the display apparatus 10 in an out of the way location such as on a hanger projecting from a wall.

The cover 16 is generally rectangular in cross-section and includes a domed upper face 41 formed with a square central opening defining a window 43 having a lens 45 therein through which the mosaic may be viewed when mounted on the platen frame 20 (FIG. 1). The cover further includes a small offset square opening 47 spaced from one corner of the window 43. The cover includes a downwardly projecting peripheral skirt 49 having cross-sectional dimensions slightly greater than that of the upstanding peripheral side wall 23 for slidable extension downwardly thereover. A plurality of raised deflectable, curved, downwardly projecting hooks (not shown) are formed in spaced apart relation on the inner face of the cover for engagement with respective spaced apart upstanding latches 51 (FIG. 1) formed on the main frame 18 to conveniently and securely yet releasably connect the cover with the main frame.

The main frame 18 is generally rectangular in cross-section and is formed with a planar border defining a platen support tray 40 carried medially from a vertically projecting peripheral rim 42 having slightly smaller dimensions in its bottom extremity than that of the upstanding pan side wall 23 for extension downwardly into the peripheral groove 29 to house the main frame in the pan 14. Such rim 42 is formed in its upper extremity with an inset upstanding peripheral lip 44 projecting upwardly from the platen tray and formed in its opposite sides with a plurality of longitudinally spaced, lateral mounting bores 46 for adjustable engagement with the respective ends of the biasing arms 24 and 26 to adjustably connect the platen and main frames. The top end run of the peripheral wall 42 is likewise formed with a mounting bore 47 (FIG. 3) for adjustable engagement with the biasing arm 22. The platen support tray 40 has formed centrally therein a generally rectangular opening 48 for registration over the light tubes 31 and the lens 45. The opening is formed at one longitudinal end thereof with a generally trapezoidal shaped clearance opening 50 (FIG. 1) terminating in a reduced in dimension rectangular opening 52 for extension therethrough of the gear motor 32 (FIG. 2) as described in greater detail below.

The main frame 18 houses at the bottom end thereof a laterally extending, stationary lower mask holder bar 54 including a U-shaped bracket 58 and a plurality of sharp hooks 56 formed on the upper end thereof and projecting generally downwardly as viewed in FIG. 2 to engage the bores 89 formed along the bottom edge of the mask 83 (FIG. 1). Disposed at the opposite longitudinal end of the main frame is a pivotable laterally extending upper mask holder bar and tensioner 60, likewise including a plurality of sharp hooks 62 formed on the upper end thereof and projecting upwardly as viewed in FIG. 2. The upper mask holder and tensioner is formed at its opposite ends with a rearwardly projecting, fan shaped mounting flanges 64 projecting through respective slots 66 in the platen support tray 40 to mount cylindrical pivot rods (not shown) releasably engaged with respective pairs of opposing, deflectable, downwardly extending mounting tabs (not shown) carried from the underside of the tray 40. Thus the mask holder and tensioner may pivot to a degree dictated by the clearance between the ends of the respective slots and of the opposite edges of respective flanges 64. A plurality of biasing springs 68 (FIG. 2) releasably connect to the mask holder and tensioner 60 to the top run of the upstanding lip 44 and serve to bias such mask holder and tensioner away from the lower holder bar 54 to thereby serve to tightly mount the mask over the main frame. The upper and lower mask holders cooperate to define an anchor assembly for securely mounting the mask immovable to the main frame.

The platen frame 20 is constructed of translucent polycarbonate and is generally box shaped to include a generally peripheral border 71 having an upstanding wall 70 rising upwardly therefrom to form a dome shaped, transparent or translucent platen support window 73 to support thereon the mosaic and allow for the projection therethrough of light from the light tubes 31. Formed at the opposite lateral sides of the platen frame are a pair of eccentric drive mounts, generally designated 75, configured with outwardly opening cut-outs 76 for projection of respective drive pins 78 carried by the pulleys of the respective eccentric drives 28. The eccentric drives mount ball bearing assemblies which may include mounting posts 35 to be received in drive holes 87 formed in the mosaic 81 or may be formed with eccentrically located, upwardly opening mounting bores 30 formed in the respective inner races for receipt of nylon posts for receipt in such mosaic mounting bores. The top surfaces of the respective ball bearing assemblies may be formed with respective index markers 95 which are located to, for instance, be in a position so when rotated to a location 45 degrees of respective vertical planes through the axes of such ball bearing assemblies, place the mosaic driven thereby to the upper right quadrant relative to the apertures of the mask 81.

Formed at one longitudinal end of the platen frame is a C-shaped motor mounting bracket, generally designated 80, formed with a generally semi-circular cut-out 82 and including a pair of opposing, inwardly concave gripping straps 84 configured for grasping the opposite sides of the motor body, such arms terminating in respective radially outwardly turned opposing fastener flanges 85 including respective bores for receipt of a screw or other such fastener to securely mount the motor on the platen frame (FIG. 1). Formed in the bottom run of the upstanding wall 70 adjacent the motor mounting bracket are a pair of spaced apart rectangular clearance openings 88 for extension therethrough of respective drive belts 34 (FIG. 2).

The display apparatus as shown in FIGS. 1 and 2 is provided for exemplary purposes to illustrate one display apparatus into which the present invention may be incorporated and is not meant to limit the invention. For example, although a rotary drive assembly is shown and described in which a pair of eccentric drives mount and move a mosaic on a closed loop circular path, it will be appreciated that many other types of drive assemblies could be employed to sequentially register the sets of image pixels with the aperture pattern. A rotary drive assembly could be connected to the mask to move the mask through a circular path in order to achieve the sequential registration of the sets of image pixels with the aperture pattern. A drive assembly could be coupled with either the mosaic or the mask to drive the coupled sheet through a square path to achieve such sequential registration. In addition, a drive assembly may be provided which couples with both the mosaic and mask and which serves to oscillate one of the mask and mosaic in a lateral direction and the other in a longitudinal direction to sequentially display the discrete images. Thus, it is to be appreciated that the present invention is suitable for use with a plurality of display devices incorporating various drive assemblies, and is not to be limited to one particular display device with one type of drive assembly.

Figure 4:
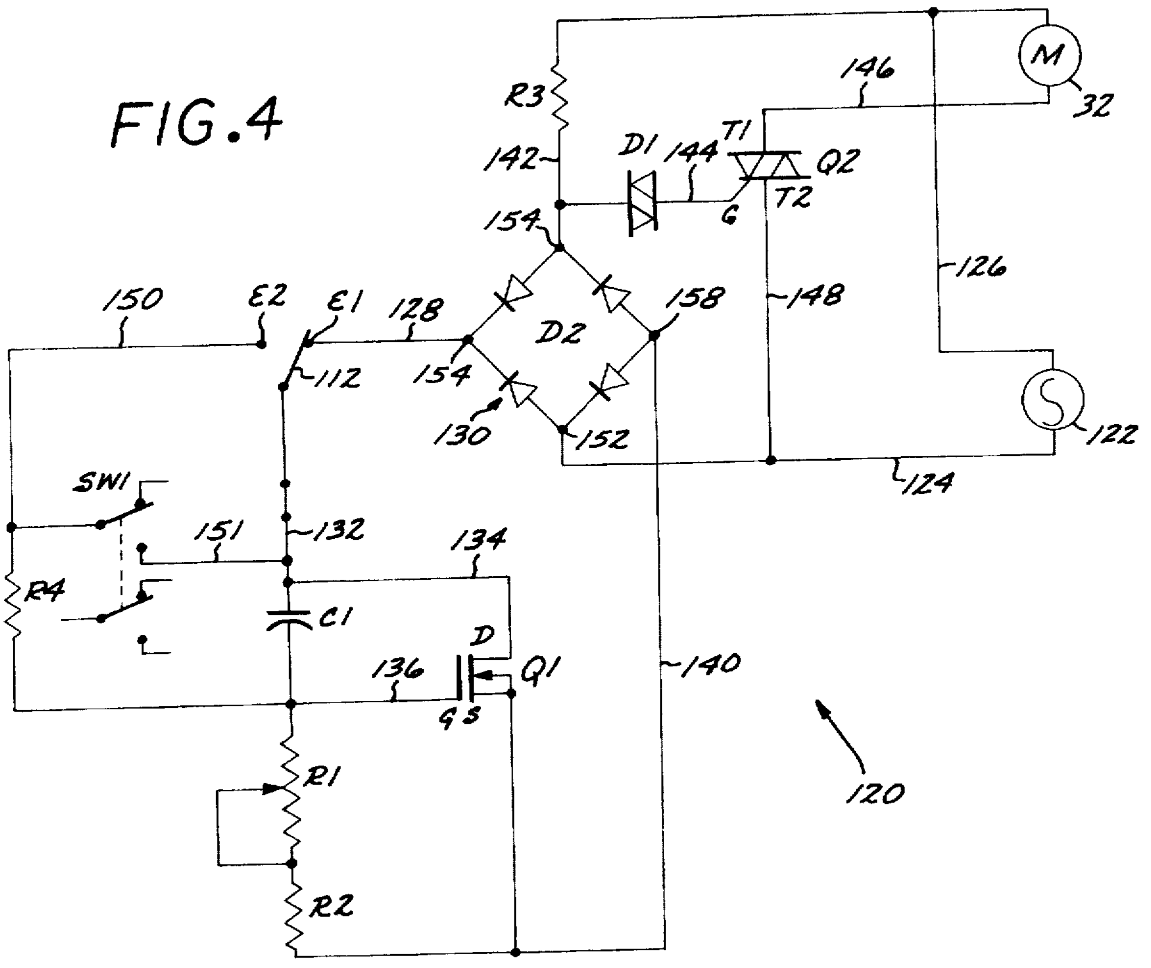
FIG. 4 is a schematic drawing of a timing circuit included in the apparatus shown in FIG. 1.

Referring to FIGS. 1, 3, and 4, there is shown, generally, the control system 100 included in the present invention which is operative to selectively empower and deactivate the gear motor 32 for precise predetermined time periods to display the various images for selected periods of time through the mask. The control system shown for exemplary purposes includes a timing cam 102 mounted for rotation with the gear motor drive shaft and interposed between the belt pinions 33 and the motor housing. The cam includes a peripheral operating surface 104 formed with a plurality of radially projecting lobes 106 spaced a predetermined angular distance apart. In the preferred embodiment, the mosaic is formed with four sets of image pixels interspersed thereon and thus the cam is formed with four such lobes spaced 90 degrees apart to correspond with four dwell positions as described in greater detail below.

The control system 100 further comprises a sub miniature mechanical control switch, generally designated 108, including a follower end 110 in sliding engagement with the operating surface 104 of the cam 102. The control switch further comprises an electrically conductive second end 112 displaceable between a normal first position and a displaced second position. The follower end 110 of the control switch riding along the operating surface of the cam is thus driven radially outwardly when it passes over one of the lobes 106, thereby driving the second end of the control switch to its displaced second position.

Referring to FIGS. 3 and 4, there is shown a schematic of a control circuit, generally designated 120, which comprises part of the control system 100 and is operative to alternately energize and disengage the gear motor 32 in correspondence with the precise registration of the sets of image pixels on the mosaic translated with the apertures on the mask. The control circuit is connected across an AC power supply 122 by leads 124 and 126 as shown schematically in FIG. 4. Electrical leads 121 serve to conduct current from the power supply to the control circuit (FIG. 3). The electrical leads may connect to an outlet plug (not shown) for insertion into a conventional power outlet to supply AC power to the circuit.

As described above, as the cam 102 rotates during operation of the gear motor 32, the second end 112 (FIGS. 3 and 4) of the control switch 108 is alternately driven between its normal first position and its displaced second position. These positions are shown in the schematic respectively as contacts E1 and E2. The second end 112 is shown schematically in FIG. 4 in its normal position in contact with contact E1. A common signal line 128 connects contact E1 and one node of a diode bridge D2. A capacitor C1, variable resistor R1 and resistor R2 are connected in series on a common signal line 132. An N-channel metal-oxide-silicon field effect transistor (MOSFET) Q1 has its drain tied to an integrating capacitor C1 across signal line 134, and its gate connected to common signal line 136.

The diode bridge D2 has its four nodes connected to, respectively, common signal line 128, common signal line 124 leading from the power supply 122, signal line 140 and signal line 142 on which is located resistor R3.

A silicon-controlled switch D1 and the gate of a 1 amp, 600 volt triac Q2 are connected in series on common signal line 144. One main terminal T1 of the triac connects with the terminal of the gear motor 32 on signal line 146, and the other main terminal T2 of the triac connects to the power supply 122 on signal line 148.

A signal line 150 connects contact E2 with resistor R4. Thus when the second end 112 of the control switch 108 is driven by the cam 102 from its normal position engaged with contact E1 and into contact with contact E2, the capacitor C1 is connected across resistor R4, thus allowing for the charge across the capacitor to be discharged through resistor R4.

A manually actuated switch SW1 is included and is operative to connect the resistor R4 across capacitor C1 via signal line 151, thereby discharging the capacitor and maintaining the voltage across the capacitor at zero while the switch is flipped.

The triac Q2 functions as a series switch between the incoming AC line from the power supply 122 and the line-driven AC gear motor 32. It will be appreciated that the gear motor 32 is operative only when triac Q2 is on, as the triac, when off, does not conduct current from the power supply to the terminals of the motor.

The silicon controlled switch D1 is chosen having a trigger voltage often volts such that it is switched on when the voltage build-up across its terminals exceeds ten volts. When a voltage of that magnitude or greater is applied across its terminals, it switches to a conducting state and conducts current to the gate of the triac Q1 along signal line 144 to thereby turn on the triac and conduct current from the terminal T1 of the triac to the gear motor 32 along signal line 146 to turn on same.

The field effect transistor Q1, capacitor C1, and resistors R1 and R2 cooperate to form a subcircuit, generally designated 137 to function as an FET integrator. The integrator is utilized to produce a linearly rising clamp voltage. Any voltage rise on the drain of the transistor Q1 will be coupled to its gate by means of the capacitor C1, which causes such transistor Q1 to turn on harder and counteract the voltage rise on its drain.

The drain voltage of transistor Q1 is effectively clamped to a level corresponding to the voltage potential across capacitor C1 plus the gate threshold voltage of such transistor. The clamp voltage will linearly rise due to the steady voltage rise across capacitor C1 as current flows through the resistors R1 and R2. Because R1 is a potentiometer, the cumulative resistance provided by R1 and R2 in series is adjustable and thus the amount of current flow through the resistors and the rate of voltage increase across capacitor C1 may be adjusted to thereby vary the rate of increase of the clamp voltage supplied by the integrator.

The diode bridge D2 is employed to clamp the rate of voltage build-up across the silicon controlled switch (SCS) D1. The diodes in the bridge operate to limit the voltage across the AC terminals 152 and 154 of the bridge to the clamp voltage supplied by the FET integrator circuit 137 plus two diode voltage drops. Thus the voltage across D1 will be effectively limited to this voltage, which if less than 10 volts, will be insufficient to turn D1 on, and thus will not turn the motor 32 on.

The second end 112 of the control switch 108 is normally in the position shown in FIG. 4 engaged with contact E1 and serves to connect the FET integrator circuit 137 across the DC terminals 156 and 158 of the diode bridge D2. Thus the clamp voltage of the integrator is applied across the DC terminals of the diode bridge, resulting in the AC terminals 152 and 154 clamping any voltages greater than the clamp voltage of the integrator plus two diode voltage drops. When the clamp voltage rises to a level sufficient to apply a voltage of greater than 10 volts across the AC terminals of the diode bridge, D1 turns on, which results in the triac Q2 turning on to conduct current through its terminal T1 to the motor terminals to turn on the motor 32.

The motor 32 will operate to rotate the cam 102 until the follower end 110 of the control switch 108 passes over one of the lobes 106 on the operating surface 104, resulting in the second end 112 being driven off contact E1 and into contact with E2. This serves to disconnect the FET integrator 137 from the diode bridge. The voltage across SCS D1 is sufficient to maintain the motor running. The capacitor C1 is connected across resistor R4 along signal line 150 which causes capacitor C1 to be discharged. As the motor continues to run, the follower end will disengage the lobe on the operating surface, which moves the second end of the control switch back into contact with E1 and reconnects the now reset integrator circuit with the diode bridge. Because the clamp voltage of the integrator is now at or close to zero volts, the voltage across the AC terminals of the diode bridge is then clamped to only a few volts corresponding with two diode voltage drops. This voltage is insufficient to maintain SCS D1 turned on, thus causing it and triac Q2 to turn off to thereby deactivate the motor. This serves to establish an open circuit from the power supply to the motor. Because the motor is a synchronous motor, when current stops flowing to the motor, the motor stops instantly and does not coast to a stop. Due to the predetermined placement of the lobes on the cam, the deactivation of the motor corresponds with the precise registration of the apertures of the mask with one of the sets of image pixels in the mosaic. Thus the discrete image will be displayed through the apertures as the motor is deactivated.

The now reset clamp voltage generated by the integrator will steadily rise at a rate dictated by the value of capacitor C1 and the value of potentiometer R1. The larger the resistance of R1, the slower the rate of voltage increase across C1 and thus the longer dwell time before the motor is reactuated. After a predetermined amount of time, the clamp voltage will rise to a level sufficient to trigger the SCS D1, thereby reactuating the gear motor to repeat the process described above.

If a user desires to deactivate the motor 32 such as, for example, to replace the mosaic, the user may flip the manual switch SW1. When such switch is flipped, the capacitor will be continuously connected across resistor R4 along signal lead 151. As such, the capacitor will discharge through the resistor and the voltage across capacitor C1 will remain at zero volts. Thus the voltage across the AC terminals of the diode bridge will be limited to two diode voltage drops which is on the order of a few volts and is insufficient to turn SCS D1 on. Thus the motor will remain deactivated for so long as the switch SW1 is flipped. Once the mosaic change out or other maintenance is completed, the user may flip the switch back to its original position so the capacitor C1 is no longer connected across resistor R4. The capacitor will then begin to charge as described above and the motor will reactuate after the clamp voltage is sufficient to switch SCS D1 back on.

The capacitor C1 is preferably a low leakage type capacitor. Excessive leakage will slow down the device to a point where it stops altogether, as the clamp voltage would never be able to rise to a level sufficient to turn on the SCS D1. In addition, any moderate level of leakage will serve to greatly affect the dwell times and give a wide range of variations in dwell times and thus make the device somewhat unpredictable.

A number of parameters dictate the dwell time of the device. One such parameter is the capacitance value of capacitor C1. If the capacitance value increases, then the dwell time increases as well. Conversely, if the capacitance value is decreased, the dwell time likewise decreases as the capacitor will charge more quickly, thus increasing the rate of increase of the clamp voltage.

Another parameter affecting dwell time is the trigger voltage for the silicon controlled switch D1. If the trigger voltage is increased, the dwell time is obviously increased as the clamp voltage needed to trigger switch D1 will be increased.

Yet another factor affecting dwell time is, as discussed above, the resistance value of the resistors R1 and R2 in series. In the preferred embodiment, resistor R1 is a one mega ohm potentiometer and resistor R2 is a 22k ohm resistor. Thus the combined resistance value can vary between 22k and greater than one mega ohms.

Finally, the gate threshold voltage of MOSFET Q1 can affect the swell time. If the threshold voltage of Q1 increases, the dwell time decreases as the reset clamp voltage will begin at a higher voltage due to its threshold voltage.

In the preferred embodiment, the following components are employed:

| Reference | Value | Description | Typical Mfg. and Part # |
|---|---|---|---|
| C1 | 6.8 microfarads | LOW-LEAKAGE ALUMINUM ELECTROLYTIC CAPACITOR | PANASONIC ECE-A16Z6R8 |
| D1 | | | TECCOR HS-10 |
| D2 | 50 V 1.5 A | DIODE BRIDGE | GENERAL INSTRUMENT W005G |
| Q1 | VN10 | N-CHANNEL MOSFET | ZETEX VN10LP |
| Q2 | L601E3 | 600 V 1A SENSITIVE-GATE TRIAC, T092 | TECCOR L601E3 |
| R2 | 22K | ¼ W 5% RESISTOR | DIGIKEY xxxQBK-ND |
| R4 | 2.7K | ¼ W 5% RESISTOR | DIGIKEY xxxQBK-ND |
| R3 | 10K 2 W | 2 W 5% RESISTOR | DIGIKEY 10KW-2-ND |
| R1 | 1M | TRIM POT | CTS X262R105B |
| SW1 | SS-5GL-FD | MICRO SWITCH | OMRON SS-5GL-FD |
| SW2 | PHA0127 | MOMENTARY BUTTON SWITCH | PHA002UEENG003R |

In operation, a user may remove the cover 16 from the pan 14 to expose the main frame 18 and platen frame 20 for loading of a selected mosaic. The user will then select a mosaic 81 formed with the desired images and mount same on the platen window 73 to engage pre-punched drive holes with respective eccentric drives 28. It will be appreciated that the eccentric drives 28 may be both rotated to locate the respective index marks 85 in the same quadrant. The position of the platen frame 20 may then be adjusted relative to the mask by adjusting the screws mounting the adjustment arms 22, 24 and 26 to gain precise registration. A mask 83 formed with a uniform aperture pattern to register with the image segments in the mosaic 81 is mounted on the mask holders 54 and 60 outwardly of the mosaic. The cover is replaced and the device connected to a suitable power supply. The gear motor 32 is then actuated by flipping the switch SW1 to drive the eccentric drives to move the mosaic under such mask through its predetermined closed loop path. The gear motor also rotates the cam 102 until the follower end 110 of the control switch passes over one of the lobes 106 and then disengages the lobe and falls into one of the notches on the operating surface immediately adjacent the lobes. As described above, this serves to periodically abruptly deactivate the motor at the time when the corresponding mosaic image segments are registered with the respective mask apertures and due to the fact the motor is a synchronous type motor, positively stops such motor to maintain the position of the mosaic 81. After a predetermined amount of time dictated by the values of capacitor C1, SCS D1, resistor R1 and R2, and MOSFET Q1 the motor is started again. After the predetermined amount of time has elapsed, the clamp voltage created by the integrator will apply a sufficient voltage across D1 to trigger D1 to turn on and thus turn on triac Q2 and gear motor 32. The process is then repeated until the follower end of the control switch passes over the next lobe on the operating surface of the cam. The process is repeated for each of the four positions corresponding with the four lobes 106 of the timing cam.

From the foregoing, it will be appreciated that the display apparatus of the present invention incorporates relatively inexpensive components and is relatively inexpensive to manufacture. In addition, the device incorporates a relatively straightforward precise drive assembly controlled by an economical control assembly for interrupting the operation of the drive assembly at various precise dwell points and for reactuating the drive assembly after a predetermined amount of time has elapsed. This is important for good resolution of the image projected from the combined filtration provided by the precise relative positioning of the mosaic under the mask.

While a particular form of the present invention has been illustrated and described, it will also be apparent that various modifications can be made without departing from the spirit and scope of the invention. Accordingly, it is not intended that the invention be limited, except as by the appended claims.

What is claimed is:

1. Display apparatus for sequentially displaying for a predetermined time interval sets of image pixels corresponding with discrete images interlaced on a transparent mosaic sheet through an aperture pattern corresponding with the location of apertures formed in a substantially opaque mask sheet, said apparatus being powered by a predetermined power supply, said apparatus comprising:

a housing including a mounting assembly for mounting said sheets on said housing;

a drive assembly mounted on said housing, engageable with at least one of said sheets and operative to move said at least one of said sheets through a predetermined path to sequentially register said apertures with said pixels of said sets;

a synchronous AC motor mounted in said housing and electrically connected to said predetermined power supply and including a rotatable drive shaft;

a coupling device coupling said drive shaft with said drive assembly to translate rotation of said drive shaft into rotation of said drive assembly; and a control system connected to said drive shaft, and electrically connected to said motor and to said predetermined power supply, and operative to detect the angular position of said drive shaft and, upon reaching a predetermined angular position, interrupt the transmission of power from said power supply to said motor, and, after passing of said predetermined time interval, reactuate said motor.

2. Display apparatus of claim 1 wherein:

said control system comprises a cam coupled with said motor and a control switch including a follower engaged with said cam and a switch displaceable thereby from a first to a second position to generate a location signal.

3. Display apparatus of claim 2 wherein:

said cam comprises a disk cam including a peripheral edge; and said follower follows said peripheral edge.

4. Display apparatus of claim 1 wherein:

said control system comprises a silicon controlled switch and a triac, said triac including a drain electrically connected to said motor and a gate electrically connected to said silicon controlled switch, said silicon controlled switch being operative to conduct current to said gate of said triac and close the circuit between said motor and said power supply.

5. Display apparatus of claim 4 wherein:

said control system includes an integrator including a transistor electrically connected to said silicon controlled switch, a capacitor electrically connected to said transistor, and a potentiometer electrically connected in series to said capacitor, said integrator being operative to, after said predetermined time interval has passed, apply said predetermined voltage across said silicon controlled switch to actuate said silicon controlled switch.

6. Display apparatus for sequentially displaying for a predetermined amount of time sets of image pixels corresponding with discrete images interlaced on a transparent mosaic sheet through an aperture pattern corresponding with the location of apertures formed in a substantially opaque mask sheet, said apparatus being powered by a predetermined power supply, said apparatus comprising:

a housing including a mounting assembly for mounting said sheets on said housing;

a drive assembly mounted on said housing, engageable with at least one of said sheets and operative to move at least one sheet through a predetermined path to sequentially register said apertures with said pixels of said sets;

a motor mounted in said housing and electrically connected to said predetermined power supply and including a rotatable drive shaft;

a coupling device coupling said drive shaft with said drive assembly to translate rotation of said drive shaft into rotation of said drive assembly;

a cam mounted on said drive shaft for rotation therewith and including an operating surface formed with a peripheral edge of cam and a plurality of projections spaced a predetermined angular distance apart;

a control switch including a first end in sliding contact with said operating surface of said cam and an electrically conductive second end displaceable to respective first and second positions, said second end being driven from said first position to said second position when said first end engages one of said projections and driven from said second position to said first position when said first end disengages said projections;

a control circuit electrically connected to said power supply and to said motor and including a pair of contacts for respective engagement with said second end of said control switch in said first and second positions, said control circuit being responsive to said second end being disposed in said first position to transmit power from said power supply to said motor and responsive to said second end being driven to said second position to interrupt the transmission of power from said power supply to said motor, said control circuit further comprising reactuating circuitry responsive to said second end being driven from said second position to said first position to reactuate said motor after said predetermined amount of time has elapsed, said reactuating circuitry comprising an integrator including a transistor electrically connected with said silicon controlled switch, a capacitor electrically connected in parallel with said transistor, and a potentiometer electrically connected in series with said capacitor, said integrator being operative to, after said predetermined period of time has elapsed, apply a predetermined voltage across said silicon controlled switch to actuate said silicon controlled switch.

7. The display apparatus of claim 6 wherein:

said control circuit comprises a silicon controlled switch and a triac, said triac including a drain electrically connected to said motor and a gate electrically connected to said silicon controlled switch, said silicon controlled switch being operative upon application of a predetermined voltage thereacross to conduct current to said gate of said triac to actuate said triac and conduct current to said motor to actuate said motor.

8. The display apparatus of claim 6 wherein:

said projections comprise four in number and are spaced ninety degrees apart on said operating surface of said cam.

9. The display apparatus of claim 6 wherein:

said reactuating circuitry comprises an integrator including a transistor electrically connected with said silicon controlled switch, a capacitor electrically connected in parallel with said transistor, and a potentiometer electrically connected in series with said capacitor, said integrator being operative to, after said predetermined period of time has elapsed, apply said predetermined voltage across said silicon control switch to actuate said silicon control switch.

10. The display apparatus of claim 7 wherein:

said silicon controlled switch actuates upon application thereacross of greater than 10 volts.

11. The display apparatus of claim 6 wherein:

said drive assembly comprises a plurality of eccentric drives.

12. The display apparatus of claim 11 wherein:

said plurality of eccentric drives comprises two eccentric drives mounted on said housing and engageable with said moveable sheet at opposite sides of said moveable sheet.

13. Display apparatus for moving a transparent mosaic sheet through a predetermined path relative to a mask sheet and comprising:

a housing including an anchor assembly for fixedly mounting one of said sheets on said housing to serve as a fixed sheet;

a platen for carrying the other of said sheets to act as a moveable sheet;

a drive assembly mounted on said housing, engageable with said moveable sheet, and operative to move said moveable sheet through said predetermined path;

an electric motor device mounted in said housing;

a coupling device coupling said motor device with said drive assembly;

a rotary location sensor coupled with said motor device for generating a location signal;

a control circuit connected between said sensor and said motor and responsive to said location signal to stop said motor device for predetermined periods of dwell time, said control circuit comprising a silicon control switch and a triac, said triac including a drain electrically connected to said motor and a gate electrically connected to said silicon control switch, said silicon control switch being operative upon application of a predetermined voltage thereacross to conduct current to said gate of said triac to actuate said triac and close the circuit between said motor and said power supply; and said control circuit further including an integrator including a transistor electrically connected with said silicon controlled switch, a capacitor electrically connected with said transistor, and a potentiometer electrically connected in series with said capacitor, said integrator being operative to, after said predetermined period of time has elapsed, apply said predetermined voltage across said silicon control switch to actuate said silicon control switch.

14. Display apparatus for sequentially displaying for a predetermined amount of time sets of image pixels corresponding with discrete images interlaced on a transparent mosaic sheet through an aperture pattern corresponding with the location of apertures formed in a substantially opaque mask sheet, said apparatus being powered by a predetermined power supply, said apparatus comprising:

a housing including a mounting assembly for mounting said sheets on said housing;

a drive assembly mounted on said housing, engageable with at least one of said sheets and operative to move at least one sheet through a predetermined path to sequentially register said apertures with said pixels of said sets;

a motor mounted in said housing and electrically connected to said predetermined power supply and including a rotatable drive shaft;

a coupling device coupling said drive shaft with said drive assembly to translate rotation of said drive shaft into rotation of said drive assembly;

a cam comprising a disk cam including a peripheral edge mounted on said drive shaft for rotation therewith and including an operating surface formed with a plurality of projections spaced a predetermined angular distance apart and projecting radially outwardly from said peripheral edge;

a control switch including a first end in sliding contact with said operating surface of said cam and an electrically conductive second end displaceable to respective first and second positions, said second end being driven from said first position to said second position when said first end engages one of said projections and driven from said second position to said first position when said first end disengages said projections;

a control circuit electrically connected to said power supply and to said motor and including a pair of contacts for respective engagement with said second end of said control switch in said first and second positions, said control circuit being responsive to said second end being disposed in said first position to transmit power from said power supply to said motor and responsive to said second end being driven to said second position to interrupt the transmission of power from said power supply to said motor, said control circuit further comprising reactuating circuitry responsive to said second end being driven from said second position to said first position to reactuate said motor after said predetermined amount of time has elapsed;

said reactuating circuitry comprises an integrator including a transistor electrically connected with said silicon control switch, a capacitor electrically connected in parallel with said transistor, and a potentiometer electrically connected in series with said capacitor, said integrator being operative to, after said predetermined period of time has elapsed, apply said predetermined voltage across said silicon control switch to actuate said silicon control switch; and a manual control switch electrically connected to said control circuit and operative to interrupt the delivery of current to said motor to deactivate said motor.

* * * * *